Patented Oct. 19, 1937

2,096,609

UNITED STATES PATENT OFFICE 2,096,609

PROCESS FOR COAGULATING RUBBER LATICES

Friedrich Konrad Daniel, London, England, assignor of fifty-one one-hundredths to A. C. Horn Company, Long Island City, N. Y., a corporation of New York, and twenty-four one-hundredths to Frank G. Breyer, New York, N. Y.

No Drawing. Application November 21, 1936, Serial No. 112,145. In Great Britain November 4, 1935

14 Claims. (Cl. 18—50)

This invention relates to a process of coagulating rubber and similar latices such as for example gutta-percha and balata latices.

According to the invention rubber and similar latices are caused to coagulate by treating them with a polar-nonpolar organic liquid substance, which contains between 2 and 9 carbon atoms, which is not or only slightly ionized in water, which is incapable of dissolving rubber to any appreciable extent and which is not miscible with water in all proportions. Such polar-nonpolar liquid substances can be used singly or in admixture.

The term "polar-nonpolar substance" used herein is intended to denote a substance whose molecule is composed of a polar hydrophilic portion such as a hydroxyl or carbonyl group (which may be present as part of a carboxyl or carboxylic-ester group) or an amino group and a nonpolar hydrophobic portion such as a hydrocarbon radicle, and particularly an alkyl group. The words "polar" and "nonpolar" are used herein in a manner comparable to their use in literature referring to flotation processes for concentrating minerals.

By means of the process of the present invention it is possible to coagulate not only relatively unstable latices such as Hevea latex and Jelutung latex, but also comparatively highly stable latices such as Abiarana gutta-percha latex and Funtumia latex as well as latices which have been stabilized by the process described in the specification of my co-pending application Serial No. 112,146, filed November 21, 1936, for "Process of modifying the properties of rubber latices".

Suitable coagulating agents for use in carrying out the invention are, for example, isobutyl alcohol, the amyl-alcohols, cyclohexanol, isobutyric acid, valerianic acid, the methyl and ethyl esters of formic and acetic acids, ethyl malonate and ethyl aceto-acetate.

In carrying out the invention it is sufficient merely to agitate, for example, to shake or stir, the latex (which may or may not have been diluted) with the polar-nonpolar coagulating agent, the rubber particles as a rule becoming united into a single lump, usually after shaking for several seconds. Alternatively the latex may be injected into the coagulating agent in the form of a thin jet. Since coagulation depends on the formation of a second liquid phase the more sparingly soluble the coagulating agent is in the aqueous phase the better. When the latex is injected into the coagulating agent the formation of a second liquid phase and the agitation of the system to effect coagulation may occur simultaneously.

Only a small excess over the amount soluble in the aqueous phase is actually necessary, e. g. in the case of amyl-alcohol 5% reckoned on the diluted latex are sufficient, since only 3% are dissolved in the latex. It may, however, be convenient to use larger quantities to accelerate the coagulation or to facilitate the mechanical separation of the phases or the like. The loss of organic liquid is not increased by using larger amounts thereof. It is practically independent of the amount used and only depends on the solubility of the organic liquid in the aqueous phase. The organic phase can easily be recovered.

The coagulation of latices which are not readily coagulated by electrolytes may be improved and the proportion of the polar-nonpolar coagulating agent required may be reduced, if there be added to the latex prior to coagulation, a small proportion of an electrolyte, preferably one containing H-ion or a divalent or trivalent kation. The proportion of the electrolyte should not exceed about the quantity required to neutralize any alkali present in the latex and/or to deprive the rubber particles in the latex of their electrical charge.

It will be understood that customary additional substances, such as vulcanizing agents, accelerators, and so on, may be incorporated in the latex prior to coagulation, and that numerous other variations may be made in carrying out the invention without departing from its essential characteristics.

*Example I*

10 litres of Hevea latex are diluted with an equal volume of water and then thoroughly agitated for 5 seconds with from 10 to 20 litres of isobutyl or isoamyl-alcohol. The rubber precipitates in the form of a lump which is immediately removed from the liquid. The liquid is allowed to stand until its two phases have separated. In case the aqueous phase should still be very cloudy indicating the presence of residual rubber particles therein it is again agitated in order to coagulate the remainder of the rubber. The rubber separated out is again removed. The whole of the separated rubber is pressed and the liquid extracted is returned to the coagulating agent. The pressed rubber is then washed in order to remove residual organic liquid. The liquid separated from the rubber after the coagulation of the latter is allowed to stand until the aqueous and the organic phases have separated from each other and the organic phase is thereupon separated from the aqueous phase. In this manner up to 90% of isobutyl alcohol or up to 95% of isoamyl-alcohol employed is recovered.

In the case of latices such as for example, Jelutung latex which are not easily coagulated with electrolytes and which have been stabilized with alkaline stabilizers such as ammonia, it is advantageous first wholly or practically completely to neutralize the alkali. In the following an example of this method of operation is described.

*Example II*

Jelutung latex containing 300 milliequivalents of $NH_3$ per litre is treated with approximately 300 milliequivalents of acetic acid per litre. 10 litres of the thus obtained neutral or practically neutral and not otherwise diluted latex are strongly agitated with 10 to 20 litres of isoamyl-alcohol for 5 seconds. The mixture is then further treated in the manner set forth in Example I.

It may also be advisable in the case of very stable latices such as Abiarana gutta-percha latex to add to the latex a sufficient amount of electrolyte to deprive the rubber particles in the latex of their electrical charge. Thus for example, it is advisable to add acetic acid to Abiarana gutta-percha latex until an aggregation of the rubber particles takes place, which is recognizable by the rapid creaming of the latex and indicates the electrical discharge of the rubber particles. It is also possible by suitable pH determination immediately to ascertain the requisite amount of acid to be added when once the isoelectrical point of a latex is known which in the case of Abiarana lies at about 3.5.

I claim:—

1. A process of coagulating latices which comprises agitating said latices with a polar-nonpolar organic liquid substance, which contains between 2 and 9 carbon atoms, is at most slightly ionized in water, is incapable of dissolving rubber to any appreciable extent and which is not miscible with water in all proportions.

2. A process of coagulating latices which comprises injecting said latices in the form of a thin jet, into a polar-nonpolar organic liquid substance, which contains between 2 and 9 carbon atoms, is at most slightly ionized in water, is incapable of dissolving rubber to any appreciable extent and which is not miscible with water in all proportions.

3. A process of coagulating latices which are not readily coagulated by electrolytes which comprises adding to said latices a small proportion of an electrolyte and agitating the mixture with a polar-nonpolar organic liquid substance, which contains between 2 and 9 carbon atoms, is at most slightly ionized in water, is incapable of dissolving rubber to any appreciable extent and which is not miscible with water in all proportions.

4. A process of coagulating alkali-stabilized latices which comprises first practically completely neutralizing the alkali with an acid and thereupon agitating said latices with a polar-nonpolar organic liquid substance, which contains between 2 and 9 carbon atoms, is at most slightly ionized in water, is incapable of dissolving rubber to any appreciable extent and which is not miscible with water in all proportions.

5. A process of coagulating latices which is not readily coagulated by electrolytes, which comprises adding to said latex a proportion of an electrolyte not exceeding the quantity required to neutralize any alkali present in the latex and agitating the latices with a polar-nonpolar organic liquid substance, which contains between 2 and 9 carbon atoms, is at most slightly ionized in water, is incapable of dissolving rubber to any appreciable extent and which is not miscible with water in all proportions.

6. A process of coagulating latices which is not readily coagulated by electrolytes, which comprises adding to said latices a proportion of an electrolyte not exceeding the quantity which will deprive the rubber particles of their electrical charge and agitating said latex with a polar-nonpolar organic liquid substance, which contains between 2 and 9 carbon atoms, is at most slightly ionized in water, is incapable of dissolving rubber to any appreciable extent and which is not miscible with water in all proportions.

7. A process for coagulating latices which comprises forming with latex a system of at least two liquid phases including an aqueous phase embodying the latex and an organic phase composed of polar-nonpolar coagulating substance having between 2 and 9 carbon atoms, and agitating the system to coagulate the latex.

8. A process for coagulating latices which comprises forming with latex a system of at least two liquid phases including an aqueous phase embodying the latex and an organic phase composed of polar-nonpolar substance having between 2 and 9 carbon atoms and characterized by not more than slight ionization in water and no appreciable dissolution of rubber and agitating the system to coagulate the latex.

9. A process for coagulating latices which comprises forming with latex a system of at least two liquid phases including an aqueous phase embodying the latex and an organic phase composed of aliphatic polar-nonpolar coagulating substance having between 2 and 9 carbon atoms, and agitating the system to coagulate the latex.

10. A process for coagulating latices which comprises forming with latex a system of at least two liquid phases including an aqueous phase embodying the latex and an organic phase composed of polar-nonpolar aliphatic alcohol having between 2 and 9 carbon atoms and characterized by not more than slight ionization in water and no appreciable dissolution of rubber and agitating the system to coagulate the latex.

11. A process for coagulating latices which comprises forming with latex a system of at least two liquid phases including an aqueous phase embodying the latex and an organic phase composed of polar-nonpolar aliphatic ester having between 2 and 9 carbon atoms and characterized by not more than slight ionization in water and no appreciable dissolution of rubber and agitating the system to coagulate the latex.

12. A process for coagulating latices which comprises forming with latex a system of at least two liquid phases including an aqueous phase embodying the latex and an organic phase composed of polar-nonpolar aliphatic acid having between 2 and 9 carbon atoms and characterized by not more than slight ionization in water and no appreciable dissolution of rubber and agitating the system to coagulate the latex.

13. A process for coagulating latices which comprises forming with latex a system of at least two liquid phases including an aqueous phase embodying the latex and an organic phase composed of iso-butyl alcohol, and agitating the system to coagulate the latex.

14. A process for coagulating latices which comprises forming with latex a system of at least two liquid phases including an aqueous phase embodying the latex and an organic phase composed of polar-nonpolar coagulating substance having between 2 and 9 carbon atoms, agitating the system to coagulate the latex, separating the coagulated latex and the liquid, and separating the aqueous and organic phases of the liquid to recover the latter.

FRIEDRICH KONRAD DANIEL.